UNITED STATES PATENT OFFICE.

ALBERT KRAUSE, OF BUFFALO, NEW YORK.

IMPROVEMENT IN PHOSPHORESCENT SUBSTANCES.

Specification forming part of Letters Patent No. 223,050, dated December 30, 1879; application filed August 8, 1879.

*To all whom it may concern:*

Be it known that I, ALBERT KRAUSE, of the city of Buffalo, in the county of Erie and State of New York, have invented a new and useful Improved Luminous Substance, of which the following is a specification.

This invention relates to a substance which, by exposure to direct or indirect sun-light, or to artificial light, is so affected or brought into such a peculiar condition that it will emit rays of light or become luminous in the dark.

It is a well-known fact that various bodies and compositions of matter, more especially compositions containing sulphur in combination with earthy salts, possess the property of emitting rays of light in the dark after having been exposed to sun-light. All of these bodies and compositions of matter are, however, not well adapted for practical purposes, because the light emitted by them is either too feeble to be of any practicable utility, or because the luminous condition is not of sufficient duration, or because the substances are decomposed by exposure to the atmosphere.

Among the materials which have been employed with the best results for producing these luminous compositions are sea-shells, especially oyster-shells. I have found by practical experiments that only the inner surface of these shells is of considerable value in the production of luminous compositions, while the body of the shell, although substantially of the same chemical composition, does not, to any appreciable extent, aid in producing the desired result. It follows from this observation that the smallest shells, which contain the largest surface as compared with their cubic contents, will be best adapted for this purpose.

I have found that chalk, which is composed of the shells of microscopic animals, possesses the desired property in the highest degree; and my invention consists, therefore, of a luminous substance composed of such chalk, sulphur, and bismuth, as will be hereinafter fully set forth.

In preparing my improved composition I take cleaned or precipitated chalk, and subject it to the process of calcination in a suitable crucible over a clear coal or charcoal fire for three or four hours, or thereabout. I then add to the calcined chalk about one-third of its weight of sulphur, and heat the mixture for from forty-five to ninety minutes, or thereabout. A small quantity of bismuth, in the proportion of about one per cent. or less of the mixture, is added together with the sulphur.

The metal may be introduced in the metallic form in the shape of filings, or in the form of a carbonate, sulphuret, sulphate, or sulphide, or oxide, as may be most convenient.

The substance produced in this manner possesses the property of emitting light in the dark in a very high degree. An exposure to light of very short duration, sometimes but for a moment, will cause the substance to become luminous and to remain in this luminous condition, under favorable circumstances, for upward of twenty-four hours.

The intensity of the light emitted by this composition after exposure is considerable, and largely greater than the light produced by any of the substances heretofore known.

The hereinbefore-described substance may be ground with oil and used like ordinary paint; or it may be ground with any suitable varnish or be mixed in the manner of water-colors; or it may be employed in any other suitable and well-known manner in which paints are employed.

My improved luminous substance is adapted for a great variety of uses—for instance, for painting business and other signs, guide-boards, clock and watch dials, for marking the numbers on houses and railway-cars, and for painting all surfaces which are exposed periodically to direct or indirect light and desired to be easily seen during the night.

When applied with oil or varnish, my improved luminous substance can be exposed to the weather in the same manner as ordinary paint without suffering any diminution of its luminous property.

I claim as my invention—

The herein-described luminous substance, consisting of calcined chalk, sulphur, and bismuth, substantially as set forth.

ALBERT KRAUSE.

Witnesses:
 JNO. J. BONNER,
 EDW. J. BRADY.